US012748331B2

(12) United States Patent
Li et al.

(10) Patent No.: US 12,748,331 B2
(45) Date of Patent: Sep. 29, 2026

(54) MULTI-ANGLE SLIT FOR COMMON ELECTRODE LAYER OF LIQUID CRYSTAL DISPLAY

(71) Applicant: Meta Platforms Technologies, LLC, Menlo Park, CA (US)

(72) Inventors: Xiangtong Li, San Jose, CA (US); Xinyu Zhu, San Jose, CA (US); Yu-Jen Wang, San Jose, CA (US); Linghui Rao, Redmond, WA (US); Yun-Han Lee, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 77 days.

(21) Appl. No.: 18/630,816

(22) Filed: Apr. 9, 2024

(65) Prior Publication Data

US 2024/0345442 A1 Oct. 17, 2024

Related U.S. Application Data

(60) Provisional application No. 63/460,017, filed on Apr. 17, 2023.

(51) Int. Cl.
*G02F 1/1343* (2006.01)
*G06F 1/16* (2006.01)

(52) U.S. Cl.
CPC .... *G02F 1/134318* (2021.01); *G02F 1/13439* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 6,441,878 | B1 | 8/2002 | Wong | |
| 8,294,864 | B2 * | 10/2012 | Itou | G02F 1/134363 349/143 |
| 2007/0236637 | A1 * | 10/2007 | Hsieh | G02F 1/133707 349/129 |
| 2014/0043575 | A1 | 2/2014 | Lee et al. | |
| 2018/0335673 | A1 | 11/2018 | Ito | |
| 2023/0047799 | A1 | 2/2023 | Ren et al. | |

OTHER PUBLICATIONS

European Search Report for European Patent Application No. 24169885.1, dated Sep. 13, 2024, 7 pages.

* cited by examiner

*Primary Examiner* — Lucy P Chien
(74) *Attorney, Agent, or Firm* — Greenberg Traurig, LLP

(57) ABSTRACT

A liquid crystal pixel includes liquid crystals, a source electrode, and a transparent common electrode layer. The liquid crystals are configured to change an alignment of the liquid crystals in response to a voltage applied across the source electrode and the transparent common electrode layer. The slit in the transparent common electrode layer includes multiple angled sections.

20 Claims, 12 Drawing Sheets

MULTI-ANGLE SLIT FOR COMMON ELECTRODE LAYER OF LIQUID CRYSTAL DISPLAY

CROSS-REFERENCE TO RELATED APPLICATIONS

This application claims priority to U.S. provisional Application No. 63/460,017 filed Apr. 17, 2023, which is hereby incorporated by reference.

TECHNICAL FIELD

This disclosure relates generally to displays, and in particular to liquid crystal displays.

BACKGROUND INFORMATION

LCDs are usually flat-panel displays that are widely used in both consumer and commercial contexts for displaying images. LCDs are used in televisions, computer monitors, smartphones, tablets, automobiles, and head mounted displays, for example. The size and resolution of LCDs will vary by the use case for the display. Typically, LCDs include an array of liquid crystal pixels arranged in rows and columns that are illuminated by a backlight or side-illumination structure. The images are generated by modulating a voltage across each liquid crystal pixel to adjust the orientation of the liquid crystals in each pixel and thus control the light output of the liquid crystal display. Commonly, LCDs include red, green, and blue color filters to generate red-green-blue (RGB) images. Important performance requirements for LCDs may include response time, display brightness, and/or viewing angle, depending on the context.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
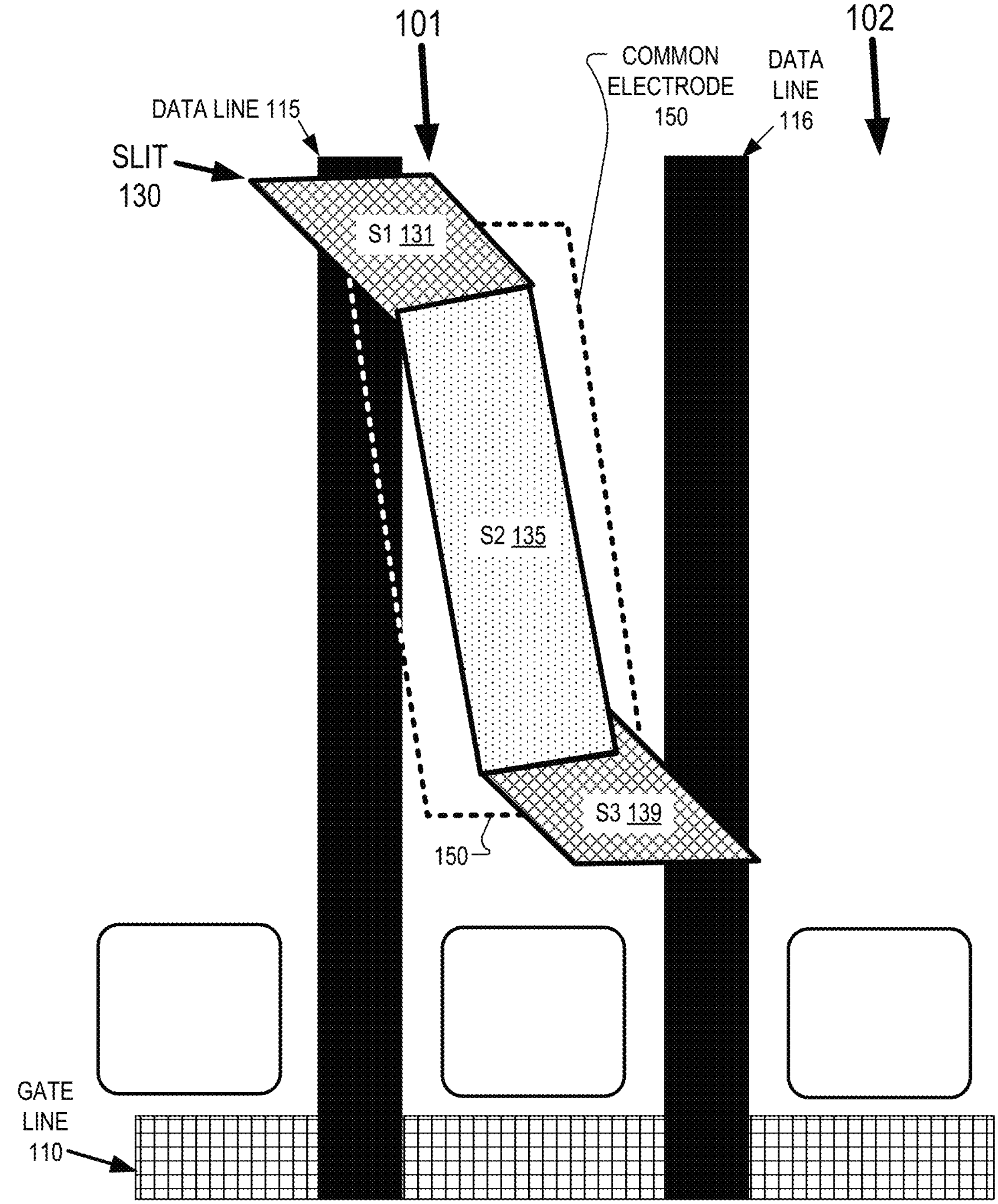
FIG. 1 illustrates a portion of a liquid crystal pixel including a slit in a common electrode layer.

Embodiments of multi-angle slits for common electrode layers of liquid crystal displays (LCDs) are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Response times for LCDs can be an important performance metric, in some contexts. For example, head-mounted displays that include LCDs may benefit from faster response times in order to better represent a virtual environment and/or a blend of a virtual environment and a real-world environment. At times, faster response times for conventional LCDs comes at the detriment to display transmittance and/or an increase in optical crosstalk between display pixels. Optical crosstalk between display pixels may cause ghosting and other undesirable optical artifacts.

In implementations of the disclosure, a slit in a transparent common electrode layer includes multiple angled sections.

The multiple angled sections may include five or more angled sections. In an implementation of the disclosure, there are five angled sections in the slit of the transparent common electrode. The main section of the five angled sections has a main angle configured to decrease a response time of a liquid crystal pixel. The main angle of the main section may be between 10 and 22.5 degrees. The five angled sections may include a first section having a first angle, a second section having a second angle, the main section having the main angle, the fourth section having a fourth angle, and a fifth section having a fifth angle. The main angle may be greater than the second angle and greater than the fourth angle and the main angle may be less than the first angle and less than the fifth angle. The second angle and the fourth angle may be configured to hide rotated liquid crystals under black matrix line or opaque electrodes of the liquid crystal pixels in order to reduce optical crosstalk between display pixels. These and other embodiments are described in more detail in connection with FIGS. 1-9.

FIG. 1 illustrates a portion of a liquid crystal pixel 101 including a slit 130 in a common electrode layer 150. Slit 130 includes a first section S1 131, a second section S2 135, and a third section S3 139. Common electrode layer 150 may extend to multiple pixels such as adjacent pixel 102. Common electrode layer 150 may be formed of a transparent or semi-transparent conductive material such as indium tin oxide (ITO). When a voltage is applied across a source electrode (not specifically illustrated) and common electrode layer 150, an electric field forms that adjusts an alignment of liquid crystals that are proximate to the source electrode. For pixel 101, a data line 115 and a gate line 110 may carry electrical signals that modulate the voltage across the source electrode of pixel 101 and the common electrode layer 150. The common electrode layer 150 may remain at a constant voltage such as zero volts while the source electrode may receive a greater voltage level that modulates the alignment of the liquid crystals. For pixel 102, data line 116 and a gate line 110 may carry electrical signals that modulate the voltage across the source electrode of pixel 102 and the common electrode layer 150. The common electrode layer 150 may be electrically coupled between pixel 101 and 102 while the source electrode for pixel 101 is electrically isolated from the source electrode for pixel 102 so that each pixel can be individually modulated with different modulation voltages.

FIG. 1 shows that slit 130 includes three different regions. Slit 130 is a void in the common electrode layer 150. Hence, if common electrode layer 150 was made from ITO, slit 130 would be a void in the ITO.

Figure 2:
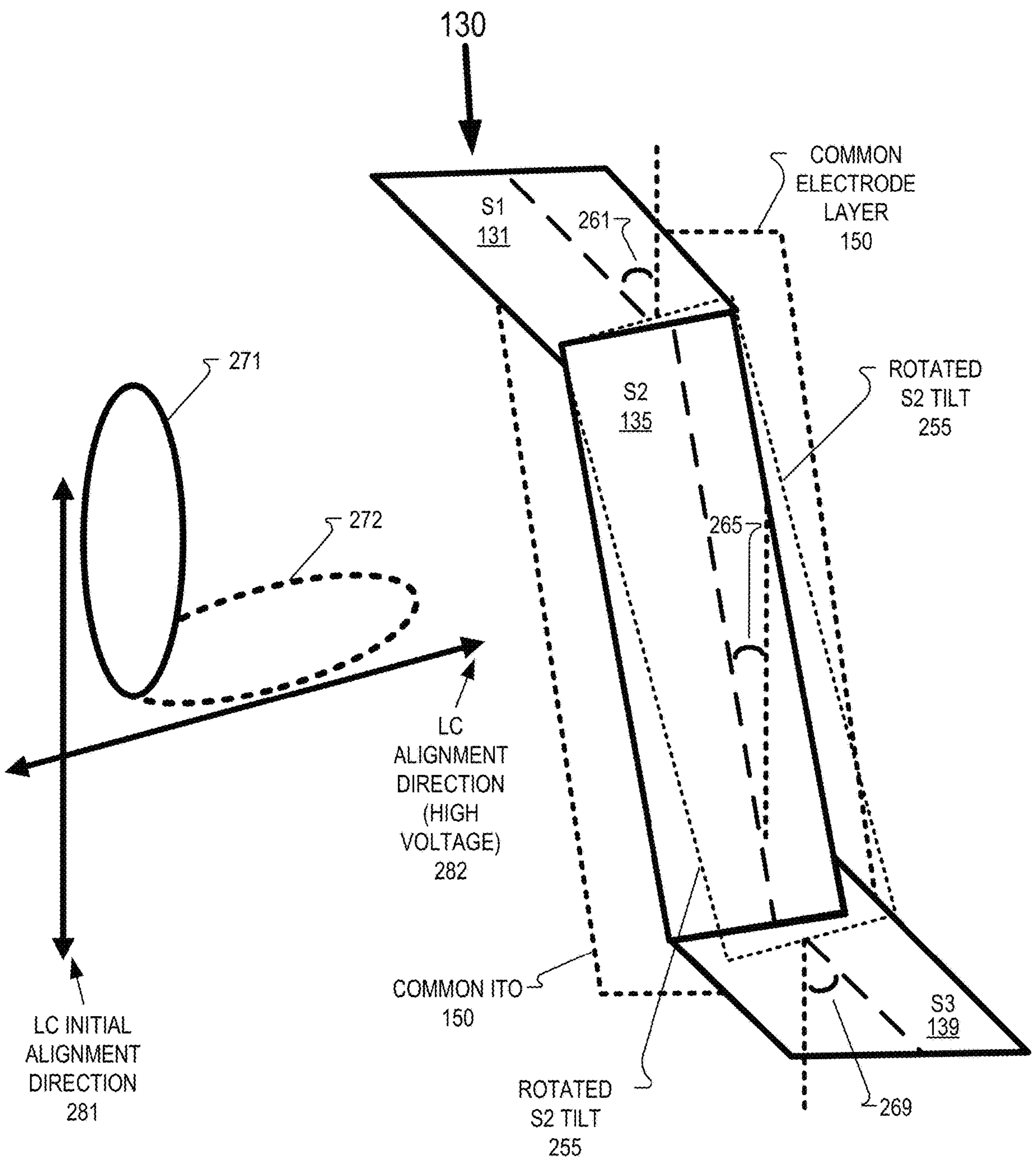
FIG. 2 illustrates a more detailed view of a slit and its relationship to liquid crystals.

FIG. 2 illustrates a more detailed view of slit 130 and its relationship to liquid crystals. First section S1 131 has a first angle 261. First angle 261 is an angle with respect to a liquid crystal initial alignment direction 281. Second section S2 135 has a second angle 265. Second angle 265 is an angle with respect to a liquid crystal initial alignment direction 281. Third section S3 139 has a third angle 269. Third angle 269 is an angle with respect to a liquid crystal initial alignment direction 281. FIG. 2 also illustrates a rotated S2 tilt plane 255 of second section S2 135.

Liquid crystal 271 shows the liquid crystal initial alignment direction 281 in an electrical off state and liquid crystal 272 shows the liquid crystal alignment direction 282 in an electrical on state. Second section S2 is angled so that slit 130 generates a faster response time for the liquid crystal pixel (e.g. pixel 101 or 102) because the liquid crystals do not have to rotate as far to modulate the light propagating through the pixel.

While increasing the angle of slit 130 may increase the response time, increasing the angle 265 also may result in the light being (at least partially) blocked by the source electrode, data lines, or a black matrix pattern that defines pixel boundaries. The blocking or partial blocking of the light reduces the transmittance of light through the liquid crystal pixels and consequently reduces the efficiency of an LCD that includes the liquid crystal pixels. Optical crosstalk between adjacent pixels may also increase when angle 265 is increased. The optical crosstalk may be particularly problematic where second section S2 135 meets first section S1 131 near data line 115, in FIG. 1. In the context of red, green, and blue adjacent pixels, the optical crosstalk results in increased color mixing.

Figure 3A:
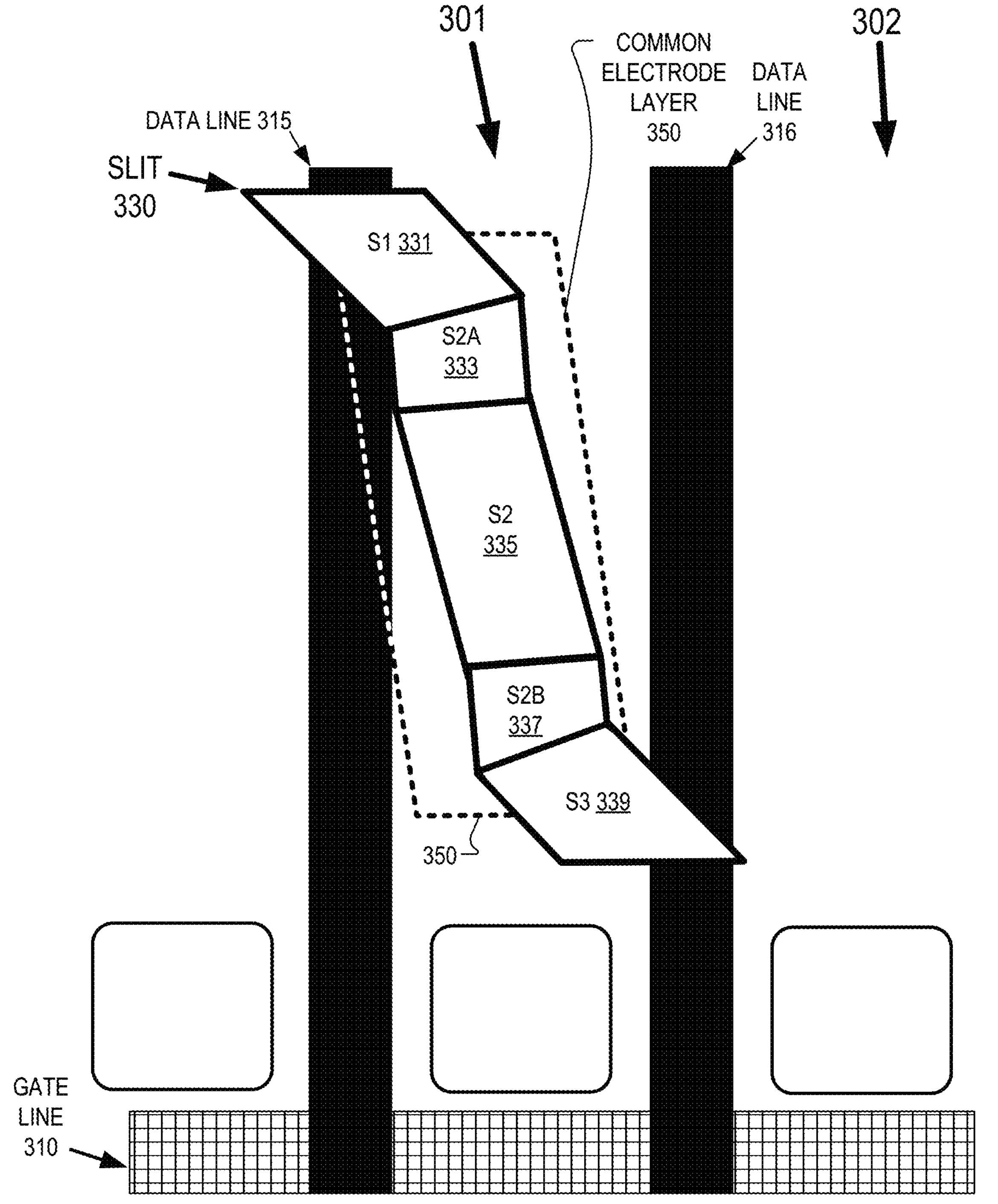
FIG. 3A illustrates a portion of a liquid crystal pixel including a five angled section slit in a common electrode layer of the liquid crystal pixel, in accordance with aspects of the disclosure.

FIG. 3A illustrates a portion of a liquid crystal pixel 301 including a five angled section slit 330 in a common electrode layer 350, in accordance with implementations of the disclosure. Slit 330 includes a first section S1 331, a second section S2A 333, a main section S2 335, a fourth section S2B 337, and a fifth section S3 339. Common electrode layer 350 may extend to multiple pixels such as adjacent pixel 302. Common electrode layer 350 may be formed of a transparent or semi-transparent conductive material such as indium tin oxide (ITO). When a voltage is applied across a source electrode of liquid crystal pixel 301 (not specifically illustrated) and common electrode layer 350, an electric field forms that adjusts an alignment of liquid crystals that are proximate to the source electrode of the liquid crystal pixel 301.

For pixel 301, a data line 315 and a gate line 310 may carry electrical signals that modulate the voltage across the source electrode of pixel 301 and the common electrode layer 350. In some implementations, data line 315 is tilted at an angle between 5 degrees and 30 degrees with respect to the main section. In some implementations, data line 315 of liquid crystal pixel 301 is tilted at a same angle as main section 335. In some implementations, data line 315 is tilted at an angle between 14 and 16 degrees.

The common electrode layer 350 may remain at a constant voltage such as zero volts while the source electrode may receive a greater voltage level that modulates the alignment of the liquid crystals. For pixel 302, data line 316 and gate line 310 may carry electrical signals that modulate the voltage across the source electrode of pixel 302 and the common electrode layer 350. The common electrode layer 350 may be electrically coupled between pixel 301 and 302 while the source electrode for pixel 301 is electrically isolated from the source electrode for pixel 302 so that each pixel can be individually modulated.

Slit 330 is a void in the common electrode layer 350. Hence, if common electrode layer 350 was made from ITO, slit 330 would be a void in the ITO.

Figure 3B:
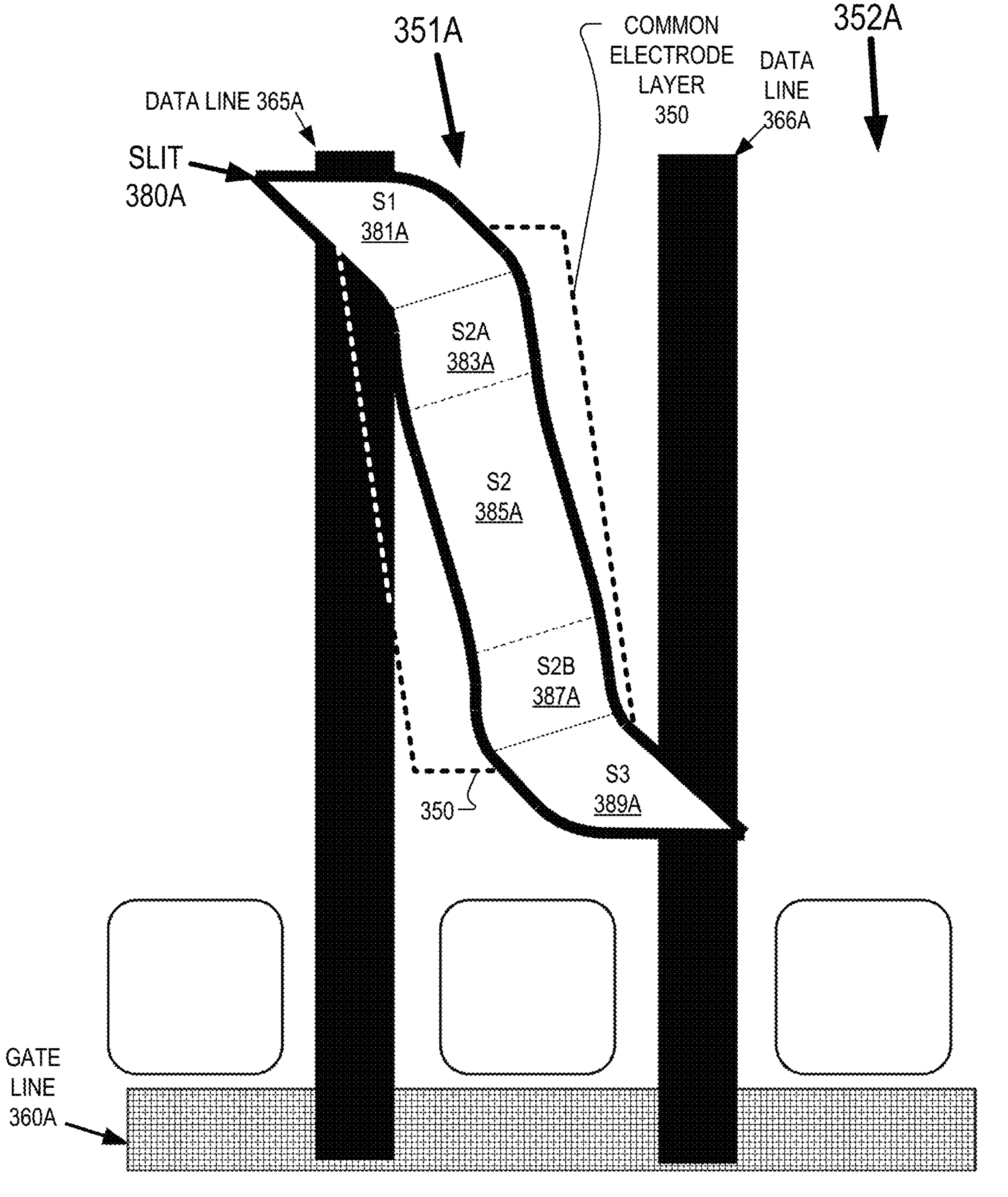
FIG. 3B illustrates a portion of a liquid crystal pixel including a five angled section slit having smoothed transitions between the sections, in accordance with aspects of the disclosure.

FIG. 3B illustrates a portion of a liquid crystal pixel 351A including a five angled section slit 380A having smoothed transitions between the sections, in accordance with aspects of the disclosure. Slit 380A includes a first section S1 381A, a second section S2A 383A, a main section S2 385A, a fourth section S2B 387A, and a fifth section S3 389A. FIG. 3B shows that the transitions between sections S1 381A, S2A 383A, S2 385A, S2B 387A, and S3 389A may be smoothed.

Common electrode layer 350 may extend to multiple pixels such as adjacent pixel 352B. When a voltage is applied across a source electrode of liquid crystal pixel 351A (not specifically illustrated) and common electrode layer 350, an electric field forms that adjusts an alignment of liquid crystals that are proximate to the source electrode of the liquid crystal pixel 351A.

For pixel 351A, a data line 365A and a gate line 360A may carry electrical signals that modulate the voltage across the source electrode of pixel 351A and the common electrode layer 350. For pixel 352A, data line 366A and gate line 360A may carry electrical signals that modulate the voltage across the source electrode of pixel 352A and the common electrode layer 350. The common electrode layer 350 may be electrically coupled between pixel 351A and 352A while the source electrode for pixel 351A is electrically isolated from the source electrode for pixel 352A so that each pixel can be individually modulated.

Slit 380A is a void in the common electrode layer 350. Hence, if common electrode layer 350 was made from ITO, slit 380A would be a void in the ITO.

Figure 3C:
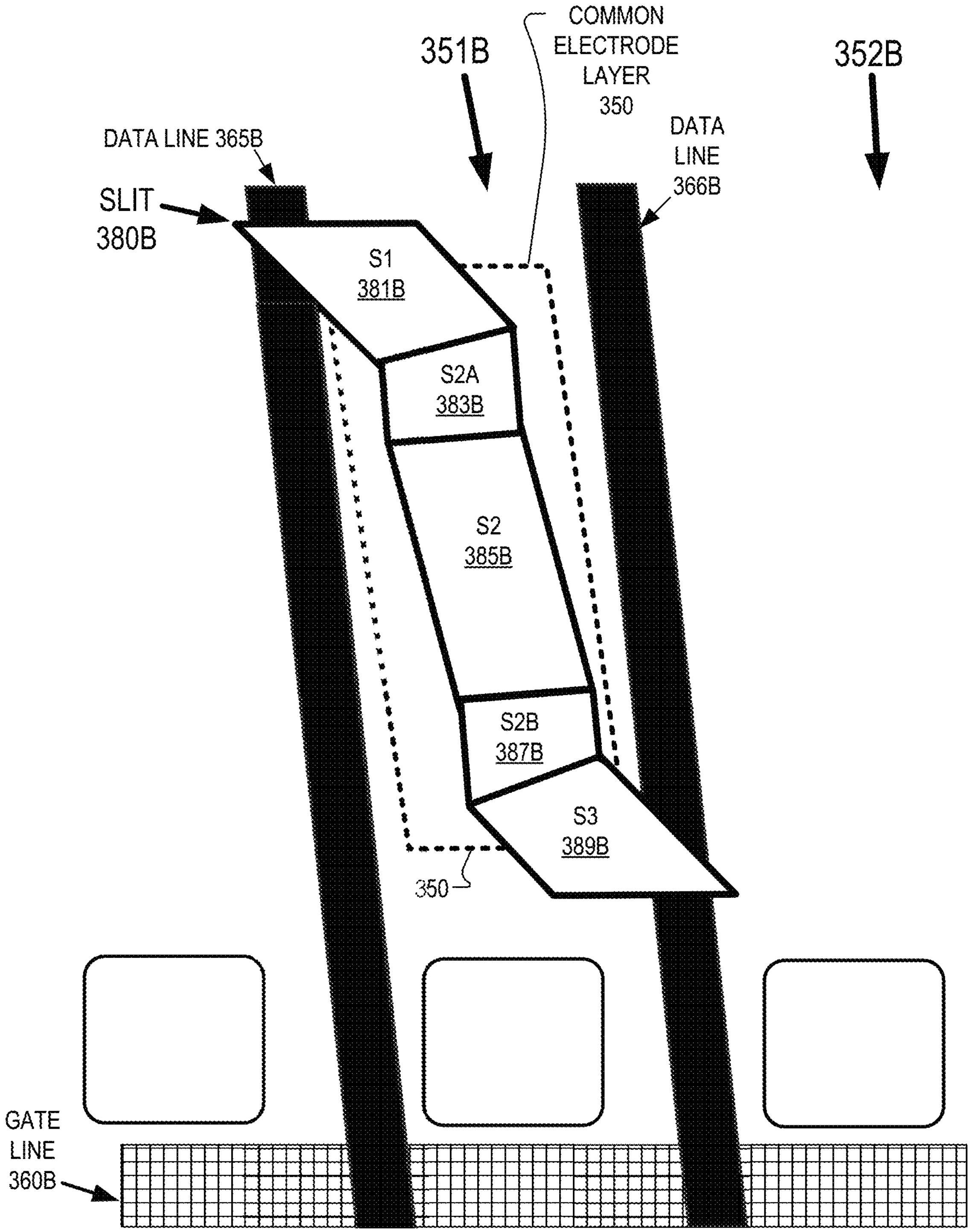
FIG. 3C illustrates a portion of a liquid crystal pixel including a five angled section slit and tilted data lines, in accordance with aspects of the disclosure.

FIG. 3C illustrates a portion of a liquid crystal pixel 351B including a five angled section slit 380B and tilted data lines 365B and 366B, in accordance with aspects of the disclosure. Data line 365B of liquid crystal pixel 351B may be tilted at an angle between 5 and 35 degrees. In an implementation, data line 365B is tilted at a same angle as main section 335.

Slit 380B includes a first section S1 381B, a second section S2A 383B, a main section S2 385B, a fourth section S2B 387B, and a fifth section S3 389B. Common electrode layer 350 may extend to multiple pixels such as adjacent pixel 352B. When a voltage is applied across a source electrode of liquid crystal pixel 351B (not specifically illustrated) and common electrode layer 350, an electric field forms that adjusts an alignment of liquid crystals that are proximate to the source electrode of the liquid crystal pixel 351B.

For pixel 351B, data line 365B and a gate line 360B may carry electrical signals that modulate the voltage across the source electrode of pixel 351B and the common electrode layer 350. For pixel 352B, data line 366B and gate line 360B may carry electrical signals that modulate the voltage across the source electrode of pixel 352B and the common electrode layer 350. The common electrode layer 350 may be electrically coupled between pixel 351B and 352B while the source electrode for pixel 351B is electrically isolated from the source electrode for pixel 352B so that each pixel can be individually modulated.

Slit 380B is a void in the common electrode layer 350. Hence, if common electrode layer 350 was made from ITO, slit 380B would be a void in the ITO.

Figure 3D:
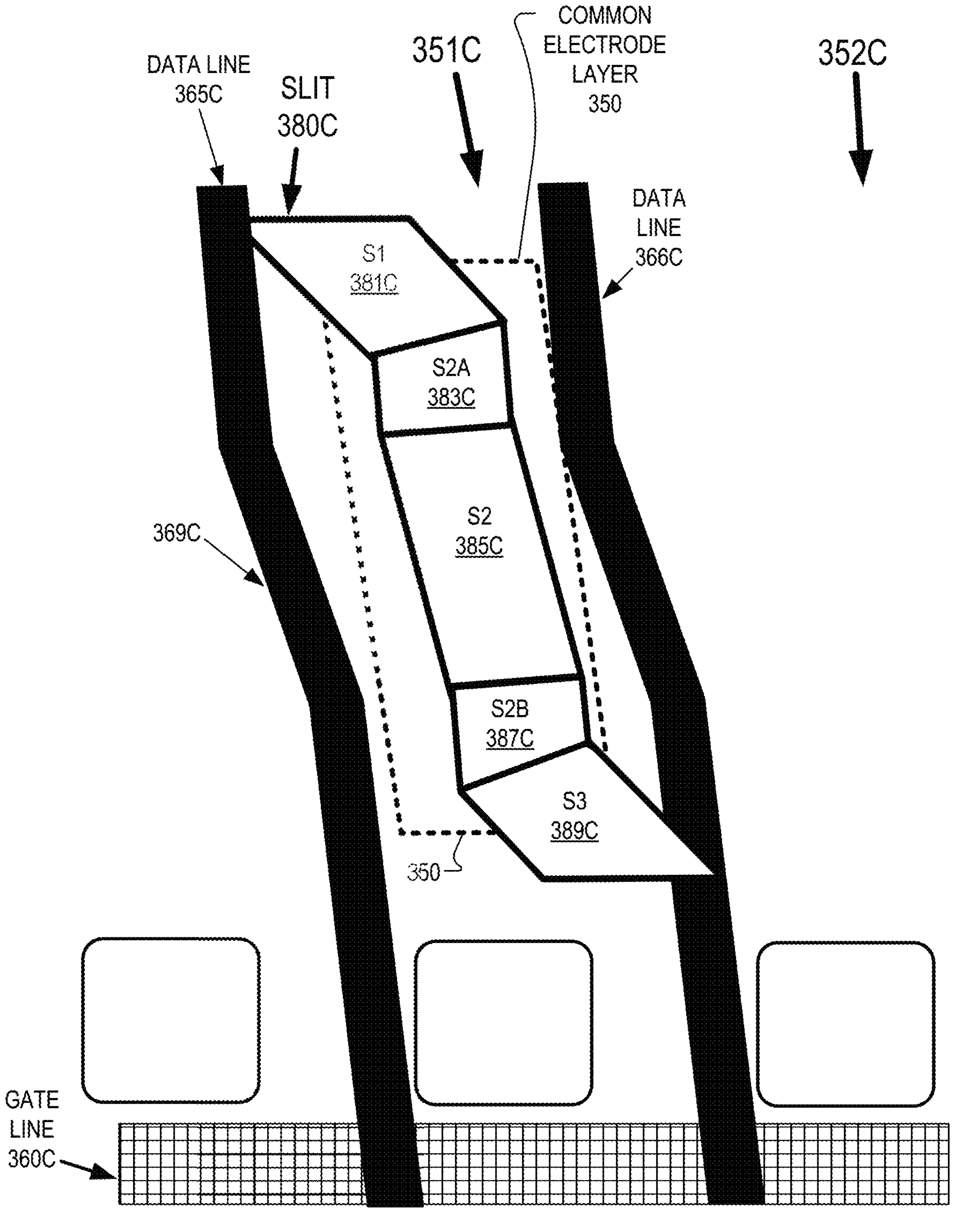
FIG. 3D illustrates a portion of a liquid crystal pixel including a five angled section slit and zig-zag data lines, in accordance with aspects of the disclosure.

FIG. 3D illustrates a portion of a liquid crystal pixel 351C including a five angled section slit 380C and zig-zag data lines 365C and 366C, in accordance with aspects of the disclosure. Zig-zag data line 365C of liquid crystal pixel 351C may be generally tilted at a tilt angle between 5 and 35 degrees while a middle section 369C of zig-zag data line 365C is tilted at a zig-zag angle that exceeds the general tilt angle. The zig-zag angle of middle section 369C may match the main angle of section S2 385C, in some implementations.

Slit 380C includes a first section S1 381C, a second section S2A 383C, a main section S2 385C, a fourth section S2B 387C, and a fifth section S3 389C. Common electrode layer 350 may extend to multiple pixels such as adjacent pixel 352C. When a voltage is applied across a source electrode of liquid crystal pixel 351C (not specifically illustrated) and common electrode layer 350, an electric field forms that adjusts an alignment of liquid crystals that are proximate to the source electrode of the liquid crystal pixel 351C.

For pixel 351C, zig-zag data line 365C and a gate line 360C may carry electrical signals that modulate the voltage across the source electrode of pixel 351C and the common electrode layer 350. For pixel 352C, data line 366C and gate line 360C may carry electrical signals that modulate the voltage across the source electrode of pixel 352C and the common electrode layer 350. The common electrode layer 350 may be electrically coupled between pixel 351C and 352C while the source electrode for pixel 351C is electrically isolated from the source electrode for pixel 352C so that each pixel can be individually modulated.

Slit 380C is a void in the common electrode layer 350. Hence, if common electrode layer 350 was made from ITO, slit 380C would be a void in the ITO.

Figure 4:
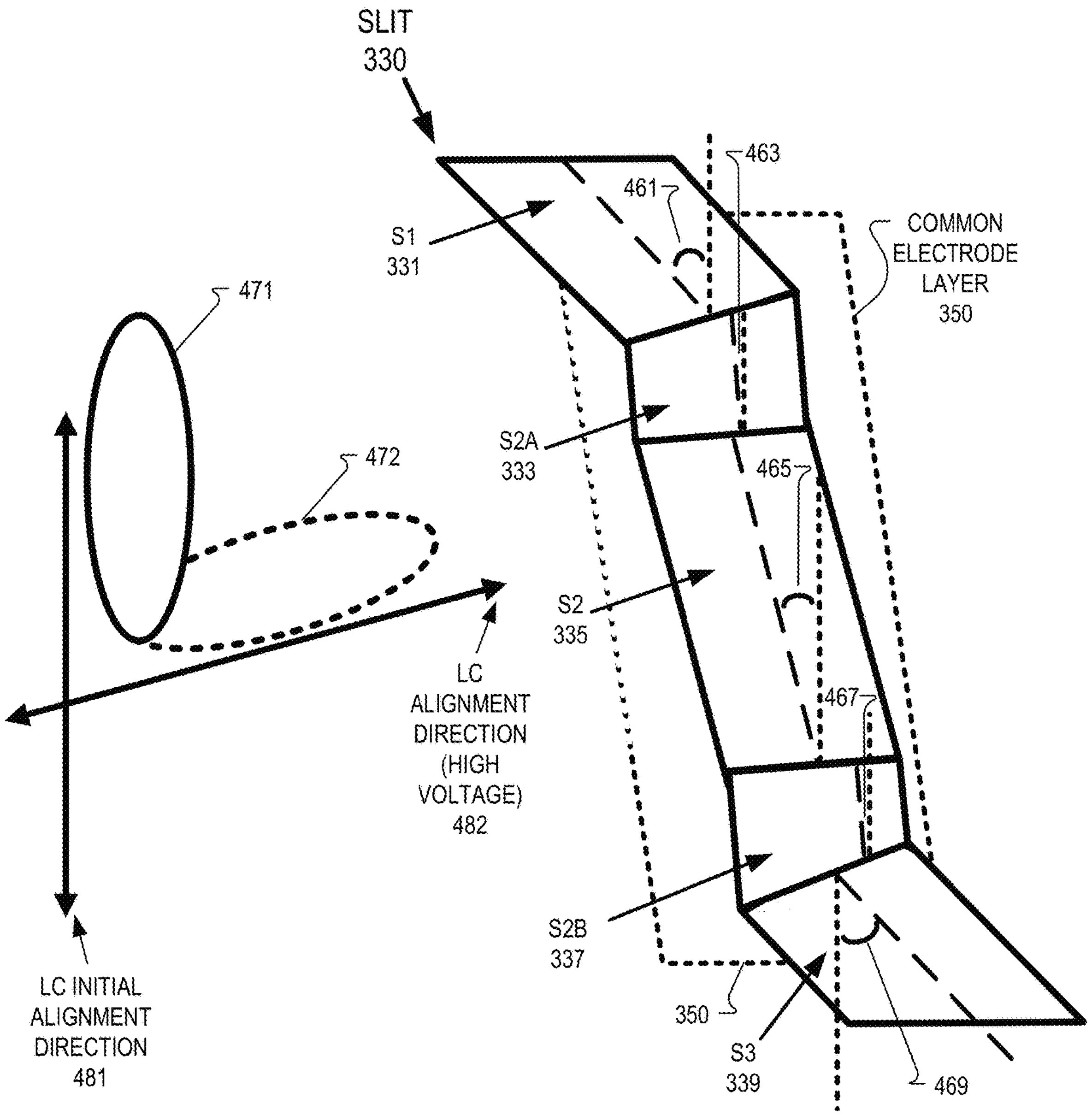
FIG. 4 illustrates a more detailed view of a five angled section slit in a common electrode layer and its relationship to liquid crystal alignment, in accordance with aspects of the disclosure.

FIG. 4 illustrates a more detailed view of slit 330 and its relationship to liquid crystal alignment, in accordance with aspects of the disclosure. First section S1 331 has a first angle 461. First angle 461 is an angle with respect to a liquid crystal initial alignment direction 481. Second section S2A 333 has a second angle 463. Second angle 463 is an angle with respect to liquid crystal initial alignment direction 481. Main section S2 335 has a main angle 465. Main angle 465 is an angle with respect to liquid crystal initial alignment direction 481. Fourth section S2B 337 has a fourth angle 467. Fourth angle 467 is an angle with respect to liquid crystal initial alignment direction 481. Fifth section S3 339 has a fifth angle 469. Fifth angle 469 is an angle with respect to liquid crystal initial alignment direction 481.

Slit 330 has five angled sections including first section 331, second section 333, main section 335, fourth section 337, and a fifth section 339, arranged in that order. These five angled sections form a contiguous void in the common electrode layer 350. Main section 335 of the five angled sections of slit 330 has a main angle 465 configured to decrease a response time of the liquid crystal pixel. While having main section 335 angled at main angle 465 decreases the response time of the liquid crystal pixel, the main angle may not be increased past a certain limit. Otherwise, the light may be blocked by a source electrode of the pixel. Additionally, increasing main angle 465 may also reduce a viewing angle of an LCD that includes pixel 301. In implementations of the disclosure, main angle 465 may be between 5 degrees and 35 degrees. In implementations of the disclosure, main angle 465 may be between 10 degrees and 22.5 degrees. In an implementation, main angle 465 is between 11 and 19 degrees. In an implementation, main angle 465 is between 13 and 17 degrees. In an implementation, main angle 465 is between 14 and 16 degrees.

In FIG. 4, main angle 465 is greater than second angle 463 and greater than the fourth angle 467. Main angle 465 is less than first angle 461 and less than the fifth angle 469, in the example illustrated implementation of FIG. 4. In an implementation, first angle 461 is substantially the same a fifth angle 469. In an implementation, second angle 463 is substantially the same as fourth angle 467. In an implementation, second angle 463 and fourth angle 467 are between eight degrees and 12 degrees. In an implementation, second angle 463 is approximately 10 degrees and fourth angle 467 is approximately 10 degrees.

Liquid crystal 471 shows the liquid crystal initial alignment direction 481 in an electrical off state and liquid crystal 472 shows the liquid crystal alignment direction 482 in an electrical on state. Main section 335 is angled so that slit 330 generates a faster response time for the liquid crystal pixel (e.g. pixel 301) because the liquid crystals do not have to rotate as far to modulate the light propagating through the pixel while the shallower angles 463 and 467 that are less than main angle 465 reduces optical crosstalk between adjacent pixels (e.g. pixel 302) that are adjacent to liquid crystal pixel 301 by keeping slit 330 in the transparent common electrode layer 350 farther from the boundary of the adjacent pixels. Second angle 463 and fourth angle 467 may be selected to hide rotated liquid crystals under black matrix or opaque electrodes of the liquid crystal pixel 301.

Figure 5:
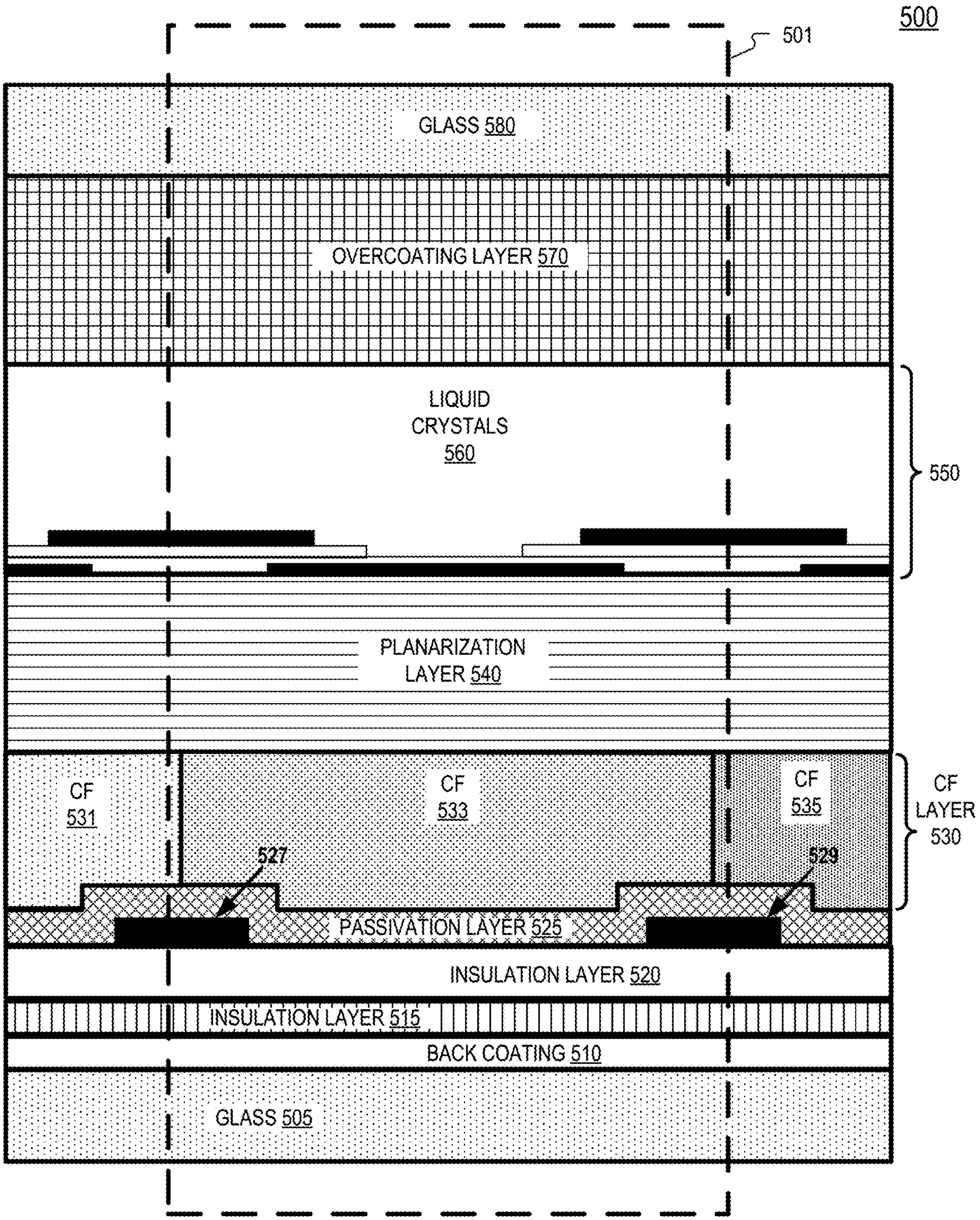
FIG. 5 illustrates a side view of a display structure showing a portion of an LCD that includes a pixel, in accordance with aspects of the disclosure.

FIG. 5 illustrates a side view of display structure 500 showing a portion of an LCD that includes liquid crystal pixel 501, in accordance with aspects of the disclosure. Example display structure 500 includes bottom glass 505, back coating 510, first insulation layer 515, second insulation layer 520, passivation layer 525, color filter layer 530, and planarization layer 540. Display structure 500 also includes layer 550 that includes electrodes, light shielding layers, and liquid crystals 560. Example display structure 500 further includes overcoating layer 570 and top glass 580. Overcoating layer 570 may be made from an organic overcoating. Top glass 580 may be considered cover glass.

Gate metal and metal routing may be disposed between insulation layers 515 and 520. Semiconductor regions 527 and 529 may include semiconductors for transistors configured to modulate voltages across source electrodes of different pixels and the common electrode layer. Passivation layer 525 may electrically insulate semiconductor regions 527 and 529 (and any electrical traces routed to semiconductor regions 527 and 529) from the rest of display structure 500.

Color filter layer 530 includes color filter 531, color filter 533, and color filter 535. Color filter 531 may be a red color filter, color filter 533 may be a green color filter, and color filter 535 may be a blue color filter, for example. In the illustration of FIG. 5, liquid crystal pixel 501 may be a blue liquid crystal pixel or a red liquid crystal pixel or a green liquid crystal pixel. Planarization layer 540 provides for a planar surface to place layer 550 and its components.

Figure 6:
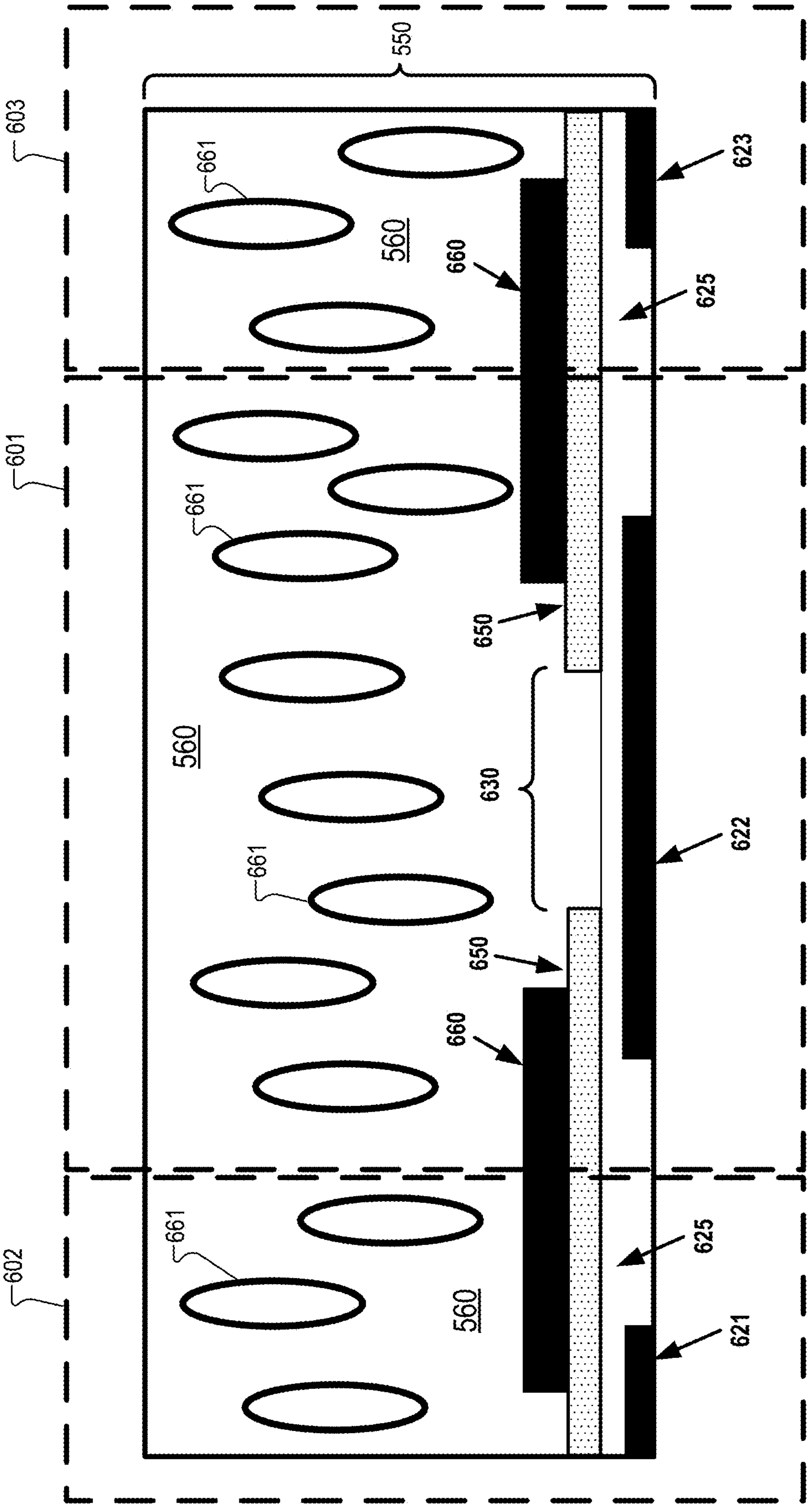
FIG. 6 illustrates a zoomed in view of a layer, in accordance with aspects of the disclosure.

FIG. 6 illustrates a zoomed in view of layer 550, in accordance with aspects of the disclosure. FIG. 6 shows that layer 550 includes liquid crystals 661 in liquid crystal layer 560. Layer 550 also includes source electrodes 621, 622, and 623. Source electrode 621 is for controlling the liquid crystal alignment for liquid crystal pixel 602, source electrode 622 is for controlling the liquid crystal alignment for liquid crystal pixel 601, and source electrode 623 is for controlling the liquid crystal alignment for liquid crystal pixel 603. Region 625 in FIG. 6 represents a metal shielding component(s) that creates boundaries between the different pixels. The metal shielding may overlap with data lines of the pixels. Layer 650 is a common electrode layer with slit 630 formed in the common electrode layer 650. Common electrode layer 650 may be transparent or semi-transparent. Slit 630 in common electrode layer 650 may include the features of the five angled sections of slit 330 described in association with FIGS. 3A-4. FIG. 6 also illustrates light shielding layer 660 disposed over common electrode layer 650. Light shielding layer 660 may be a metal layer. Light shielding layer 660 may function to increase the conductivity of common electrode layer 650. Light shielding layer 660 may also function to block light leaks between adjacent pixels such as pixels 601 and 603 and pixels 602 and 601.

Figure 7:
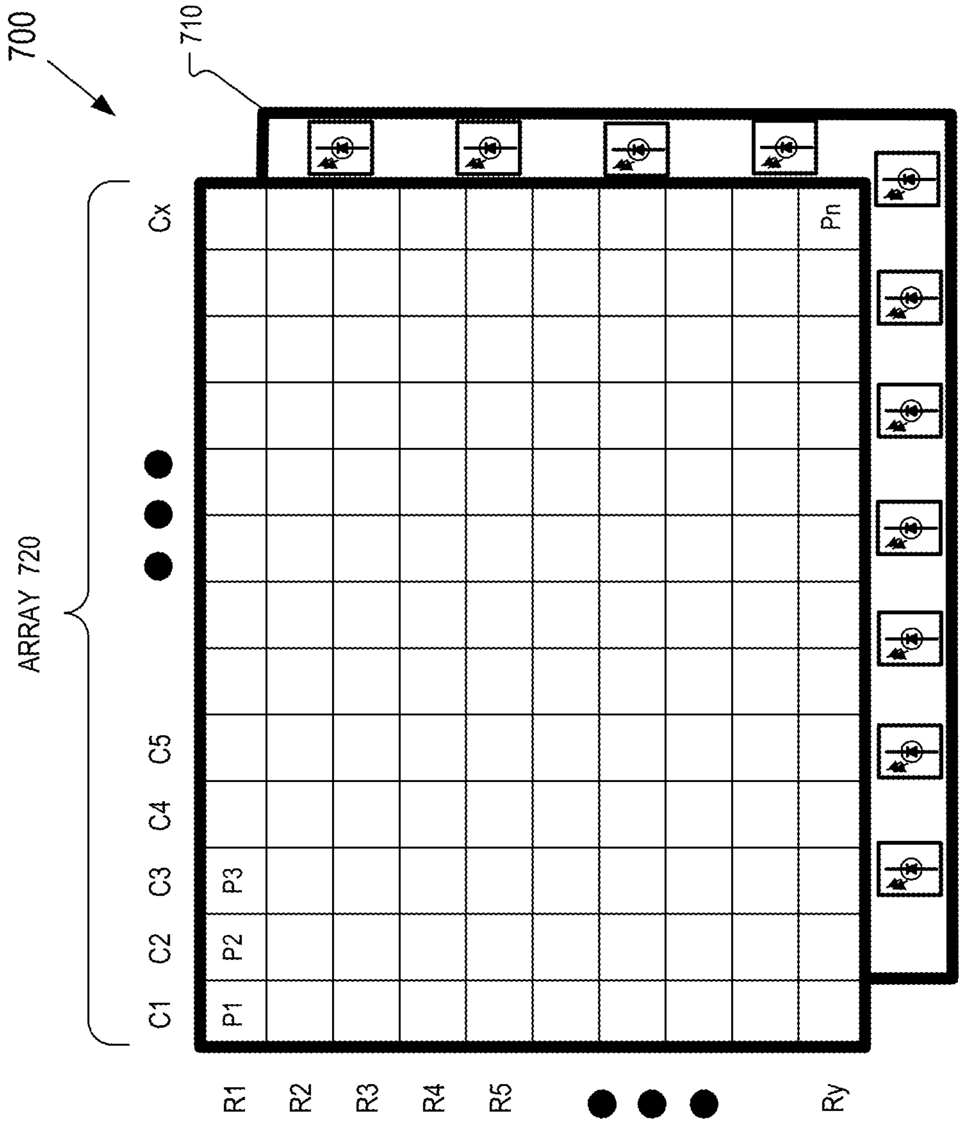
FIG. 7 illustrates a liquid crystal display including an array of display pixels illuminated by a backlight unit, in accordance with aspects of the disclosure.

FIG. 7 illustrates a liquid crystal display 700 including an array of display pixels 720 illuminated by a backlight unit 710, in accordance with aspects of the disclosure. In the illustrated implementation, array 720 includes integer n display pixels P1, P2, P3 . . . to Pn. The display pixels in array 720 are arranged in rows (y) and columns (x) wherein the product of y and x yields integer n.

Backlight layer 710 may generate illumination light to illuminate the array of display pixels 720. The array of display pixels 720 receives the illumination light from backlight layer 710 and modulates the illumination light to generate display light. The display pixels in array 720 may implement the features described in association with FIGS. 3A-6.

Figure 8:
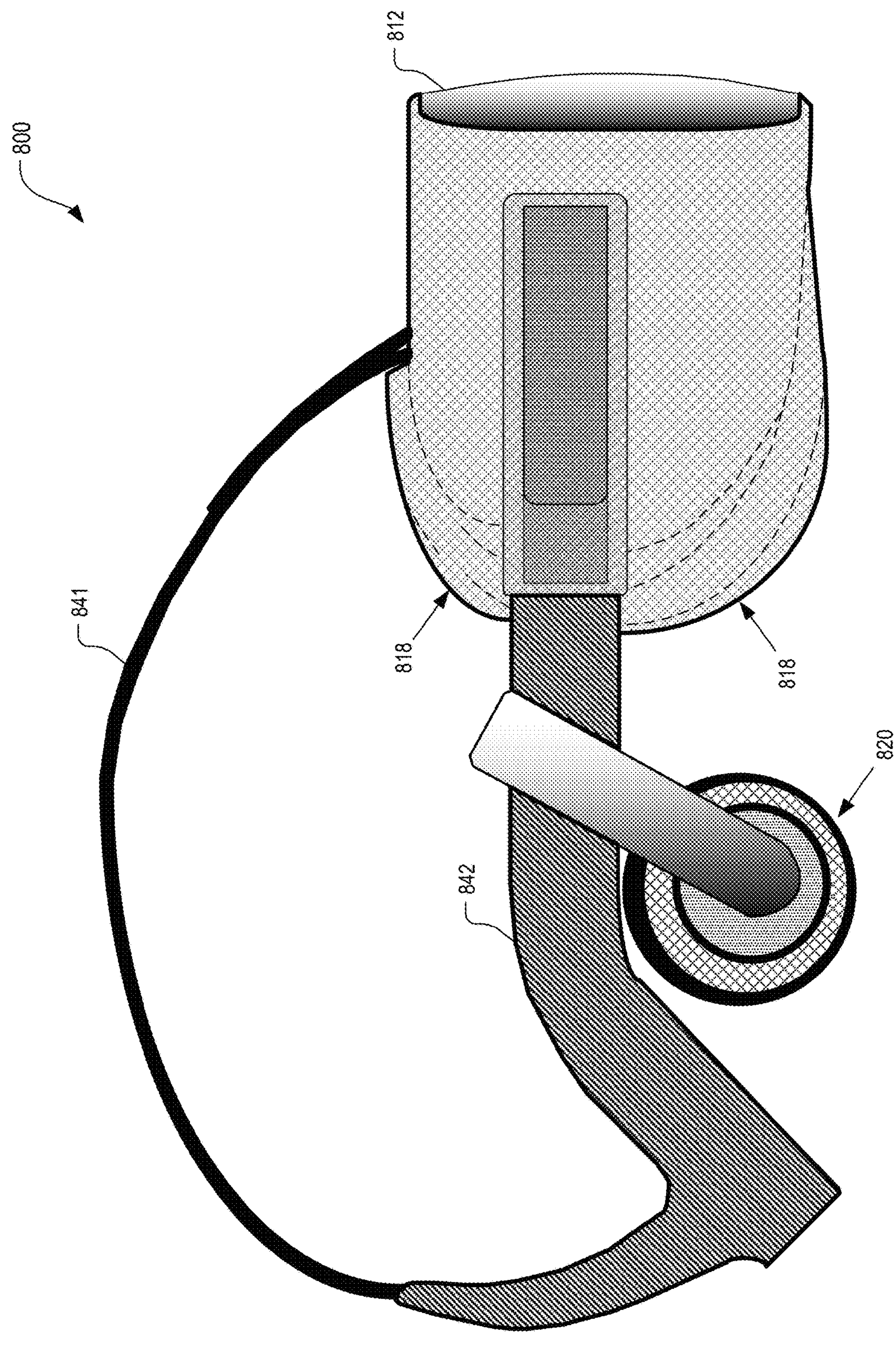
FIG. 8 illustrates an example head mounted display (HMD), in accordance with aspects of the disclosure.

FIG. 8 illustrates an example head mounted display (HMD) 800, in accordance with an embodiment of the disclosure. The HMD 800 includes a top structure 841 and a side structure 842 attached with a viewing structure 840. The illustrated HMD 800 is configured to be worn on a head of a user of the HMD 800. In one embodiment, the top structure 841 includes a fabric strap that may include elastic. The side structure 842 may include a fabric as well as rigid structures (e.g. plastics) for securing the HMD 800 to the head of the user (e.g., wearer). The HMD 800 may optionally include earpiece(s) 820 configured to deliver audio to the ear(s) of a wearer of the HMD 800.

In the illustrated embodiment, the viewing structure 840 includes an interface membrane 818 for contacting a face of a wearer of HMD 800. The interface membrane 818 may function to block out some or all ambient light from reaching the eyes of the wearer of the HMD 800.

The example HMD 800 also includes a chassis 812 for supporting hardware of the viewing structure 840 of the HMD 800. Hardware of the viewing structure 840 may include any of processing logic, wired and/or wireless data interface for sending and receiving data, graphic processors, and one or more memories for storing data and computer-executable instructions. In one embodiment, the viewing structure 840 may be configured to receive wired power. In one embodiment, the viewing structure 840 is configured to be powered by one or more batteries. In one embodiment, the viewing structure 840 may be configured to receive wired data including video data. In one embodiment, the viewing structure 840 is configured to receive wireless data including video data.

The viewing structure 840 may include an LCD, an organic light emitting diode (OLED) display, micro-LED display, quantum dot display, pico-projector, or liquid crystal on silicon (LCOS) display for directing image light to a wearer of HMD 800. The viewing structure 840 may include viewing optics (not illustrated in FIG. 8) to focus the image light for viewing by the user. Viewing structure 840 may include an LCD having display pixels configured in accordance with the descriptions of FIGS. 3A-7.

Figure 9:
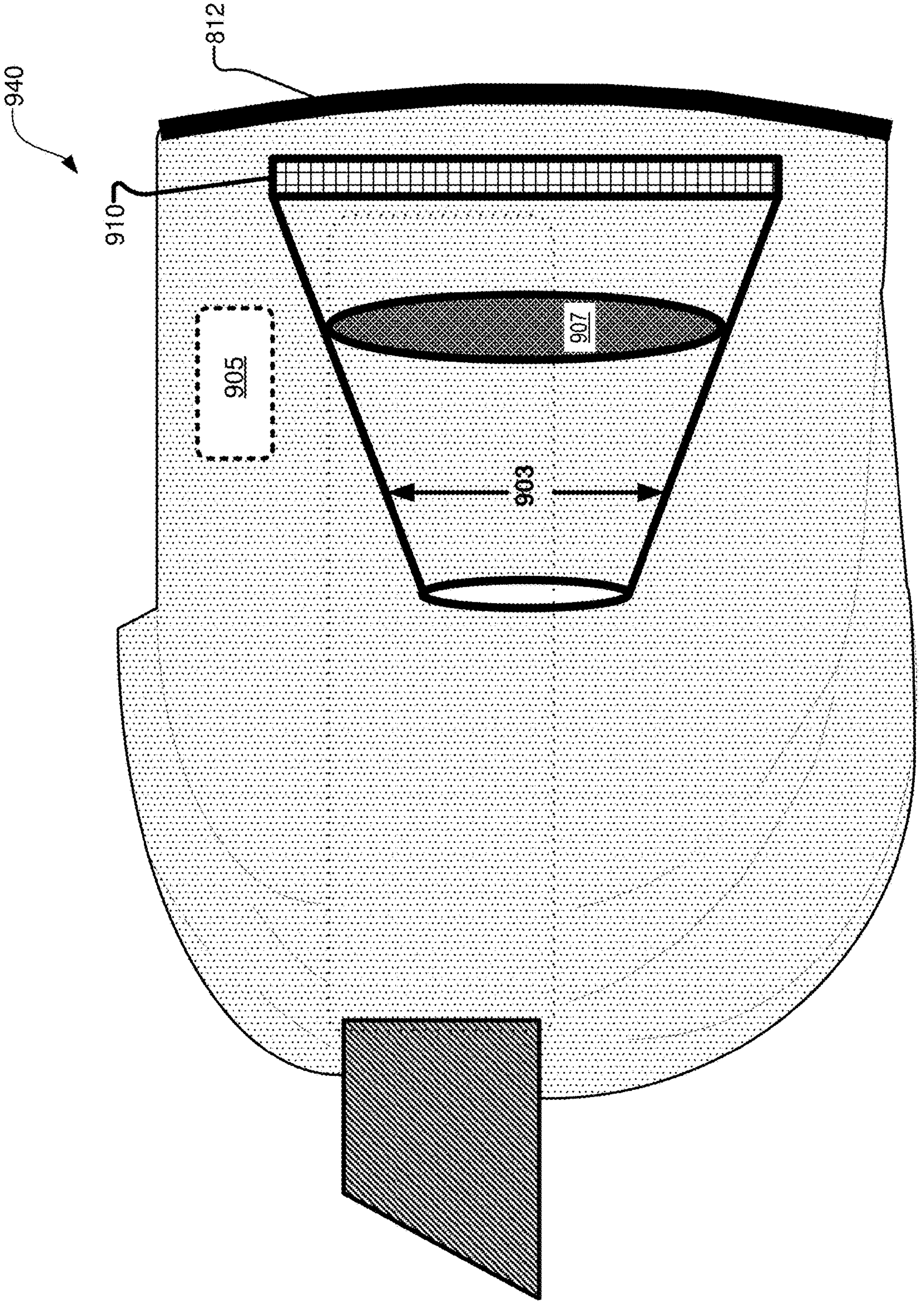
FIG. 9 illustrates an example viewing structure of an HMD that includes an LCD system 910, in accordance with aspects of the disclosure.

FIG. 9 illustrates an example viewing structure 940 of an HMD (such as the viewing structure 840 of the HMD 800 of FIG. 8) that includes an LCD system 910, in accordance with aspects of the disclosure. The LCD system 910 may include an LCD panel having liquid crystal material and other LCD-related components, a backlight unit (BLU), hardware and software, and other components and subcomponents to support operation of the LCD system 910.

The illustrated embodiment of the viewing structure 940 also includes an eye cup 903, viewing optics 907 (which may include one or more lenses configured to direct image light to an eyebox region of a user), and other components generally depicted at 905, such as a battery, one or more circuit boards such as a flexible circuit board (also known as a “flex circuit”) and a mainboard, memory or other storage device(s), etc., which may be supported by and/or housed in chassis 812. The mainboard may include one or more processors such as central processing units (CPUs) and/or graphics processing units (GPU). A flexible circuit board may be configured to deliver image signals (such as video data) from the mainboard for presentation by the LCD system 910 to the user as image light or display light (e.g., images), as well as delivering other signals to the LCD system 910 that are related to the control and operation of the LCD system 910 (such as signals to control operation of a backlight unit of the LCD system 910).

The eye cup 903 includes viewing optics 907 to focus display light generated by the LCD system 910 for the eye(s) of a wearer of the HMD that includes the viewing structure 940. Viewing optics 907 may include one or more lenses. The lenses may include refractive or diffractive optical elements.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A liquid crystal pixel comprising:

liquid crystals;

a source electrode; and a transparent common electrode layer, wherein the liquid crystals are configured to change an alignment of the liquid crystals in response to a voltage applied across the source electrode and the transparent common electrode layer, wherein:

a slit in the transparent common electrode layer includes at least five angled sections, and a main section of the at least five sections being oriented at a main angle, the orienting enabling decreasing of a response time of the liquid crystal panel.

2. The liquid crystal pixel of claim 1, wherein a main section of the five angled sections has a main angle configured to decrease a response time of the liquid crystal pixel.

3. The liquid crystal pixel of claim 1, wherein a main section of the five angled sections has a main angle between 5 degrees and 35 degrees, wherein the five angled sections include a first section, a second section, the main section, a fourth section, and a fifth section, arranged in that order.

4. The liquid crystal pixel of claim 3, wherein the main angle of the main section is between 10 degrees and 22.5 degrees.

5. The liquid crystal pixel of claim 3, wherein the main angle of the main section is between 13 degrees and 17 degrees.

6. The liquid crystal pixel of claim 3, wherein the main angle is configured to reduce a response time of the liquid crystals.

7. The liquid crystal pixel of claim 1, wherein the five angled sections of the slit in the transparent common electrode layer include:

a first section having a first angle;

a second section having a second angle;

a main section having a main angle with respect to an initial alignment of the liquid crystals;

a fourth section having a fourth angle; and a fifth section having a fifth angle, wherein the main angle is greater than the second angle and greater than the fourth angle, and wherein the main angle is less than the first angle and less than the fifth angle.

8. The liquid crystal pixel of claim 7, wherein the first angle is substantially the same as the fifth angle, and wherein the second angle is substantially the same as the fourth angle.

9. The liquid crystal pixel of claim 7, wherein the second angle and the fourth angle are configured to hide rotated liquid crystals under black matrix or opaque electrodes of the liquid crystal pixel.

10. The liquid crystal pixel of claim 7, wherein the second angle and the fourth angle are between eight degrees and 12 degrees.

11. The liquid crystal pixel of claim 7, wherein a data line of the liquid crystal pixel is tilted at a tilt angle between 5 degrees and 35 degrees with respect to the main section.

12. The liquid crystal pixel of claim 7, wherein a zig-zag data line of the liquid crystal pixel is generally tilted at a general tilt angle between 5 degrees and 35 degrees, and wherein a middle section of the zig-zag data line is tilted at a zig-zag angle that exceeds the general tilt angle.

13. The liquid crystal pixel of claim 7, wherein the second angle is less than the main angle, and wherein the fourth angle is less than the main angle, and wherein a decrease in the second angle and the fourth angle with respect to the main angle reduces optical crosstalk between adjacent pixels that are adjacent to the liquid crystal pixel by keeping the slit in the transparent common electrode layer farther from the adjacent pixels.

14. A head-mounted display (HMD) comprising:

a lens configured to focus display light; and an array of display pixels configured to generate display light, wherein the display pixels in the array include:

liquid crystals;

a source electrode; and a transparent common electrode layer, wherein the liquid crystals are configured to change an alignment of the liquid crystals in response to an electric field, wherein:

a slit in the transparent common electrode layer includes multiple angled sections, and a main section of the at least five sections being oriented at a main angle, the orienting enabling decreasing of a response time of the liquid crystal panel.

15. The HMD of claim 14, wherein a main section of the multiple angled sections has a main angle configured to decrease a response time of the display pixels.

16. The HMD of claim 14, wherein the multiple angled section of the slit in the transparent common electrode layer include:

a first section having a first angle;

a second section having a second angle;

a main section having a main angle;

a fourth section having a fourth angle; and a fifth section having a fifth angle, wherein the main angle is greater than the second angle and greater than the fourth angle, and wherein the main angle is less than the first angle and less than the fifth angle.

17. The HMD of claim 16, wherein the second angle is less than the main angle, and wherein the fourth angle is less than the main angle, and wherein a decrease in the second angle and the fourth angle with respect to the main angle reduces optical crosstalk between adjacent pixels of the display pixels by keeping the slit in the transparent common electrode layer farther from the adjacent pixels.

18. A liquid crystal display (LCD) comprising:

a backlight unit to generate illumination light; and an array of display pixels configured to receive the illumination light and modulate the illumination light to generate display light, wherein the display pixels include:

liquid crystals;

a source electrode; and a transparent common electrode layer, wherein the liquid crystals are configured to change an alignment of the liquid crystals in response to an electric field, wherein:

a slit in the transparent common electrode layer includes multiple angled sections, and a main section of the at least five sections being oriented at a main angle, the orienting enabling decreasing of a response time of the liquid crystal panel.

19. The LCD of claim 18, wherein a main section of the multiple angled sections has a main angle configured to decrease a response time of the display pixels.

20. The LCD of claim 18, wherein a main section of the multiple angled sections has a main angle between 10 degrees and 22.5 degrees, wherein the multiple angled sections include a first section, a second section, the main section, a fourth section, and a fifth section, arranged in that order.

* * * * *